US009068387B2

(12) United States Patent
Lim

(10) Patent No.: US 9,068,387 B2
(45) Date of Patent: Jun. 30, 2015

(54) HOOD OVERSLAM BUMPER ASSEMBLY

(71) Applicants: Hyundai Motor Company, Seoul (KR); Kia Motors Corporation, Seoul (KR)

(72) Inventor: Ho Lim, Suwon-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 0 days.

(21) Appl. No.: 14/030,673

(22) Filed: Sep. 18, 2013

(65) Prior Publication Data

US 2014/0292030 A1 Oct. 2, 2014

(30) Foreign Application Priority Data

Apr. 2, 2013 (KR) ........................ 10-2013-0035682

(51) Int. Cl.
*B60J 5/02* (2006.01)
*E05F 5/02* (2006.01)

(52) U.S. Cl.
CPC ...................................... *E05F 5/022* (2013.01)

(58) Field of Classification Search
CPC ................... B01D 2255/102; B01D 2255/104; B01D 2255/50; B01D 2255/9205; B01D 2255/9207; B01D 2257/704; B01D 53/8668; B60R 2021/343; B60R 21/34
USPC .................. 296/207, 187.04, 193.09, 193.11; 180/69.2
See application file for complete search history.

(56) References Cited

U.S. PATENT DOCUMENTS 4,653,968 A * 3/1987 Rapata et al. ................. 411/247
5,419,539 A * 5/1995 Bressler ........................ 267/292
6,039,388 A * 3/2000 Choi ............................ 296/207
6,119,306 A * 9/2000 Antonucci et al. ............ 16/86 A
6,318,795 B1 * 11/2001 Pyo .............................. 296/207
7,159,685 B2 * 1/2007 Knight-Newbury et al. . 180/274
7,878,578 B2 * 2/2011 Iwai et al. ................ 296/193.11
2008/0290692 A1 11/2008 Boggess

FOREIGN PATENT DOCUMENTS

JP 2005-112138 A 4/2005
JP 2008-230504 A 10/2008
KR 10-2004-0085720 A 10/2004
KR 10-0654977 B1 11/2006
KR 10-2008-0103754 A 11/2008

* cited by examiner

*Primary Examiner* — Glenn Dayoan
*Assistant Examiner* — Sunsurraye Westbrook
(74) *Attorney, Agent, or Firm* — Morgan, Lewis & Bockius LLP

(57) ABSTRACT

A hood overslam bumper assembly includes an overslam bumper having a cylindrical shape and having a screw thread groove formed in an outer peripheral surface thereof, a ring-carrier having a hole formed at the center thereof to have the overslam bumper inserted into an inner side surface thereof and having a screw thread formed on an inner peripheral surface thereof, the screw thread being coupled to the screw thread groove, and a housing having one side fixed to an insertion hole of a hood inner panel, having a hole formed at the center thereof to have the ring-carrier inserted into an inner side surface thereof, and having an elastic part provided on an outer peripheral surface thereof to fix the ring-carrier inserted into the inner side surface thereof.

6 Claims, 7 Drawing Sheets

HOOD OVERSLAM BUMPER ASSEMBLY

CROSS-REFERENCE TO RELATED APPLICATION

The present application claims priority of Korean Patent Application Number 10-2013-0035682 filed Apr. 2, 2013, the entire contents of which application is incorporated herein for all purposes by this reference.

BACKGROUND OF INVENTION

1. Field of Invention

The present invention relates to a hood overslam bumper assembly, and more particularly, to a hood overslam bumper assembly capable of securing an impact absorption space with respect to a horizontal load at the time of collision.

2. Description of Related Art

Generally, a hood of a vehicle, which is a member opening or closing a front portion mounted with a vehicle engine, is opened or closed by coupling between a hood striker disposed at approximately a front end of the hood and a hood latch of a vehicle body side to which the hood 15 is attached.

In order to alleviate impact applied by the hood 15 at the time of opening or closing the hood 15 and correct a position at which the hood 15 is attached, a hood overslam bumper is provided as shown in FIGS. 1 and 2. The hood overslam bumper is generally mounted on a hood inner panel 2 to serve to endure a load in a direction in which the hood 15 is closed, that is, an arrow direction of FIG. 2 at the time of closing the hood 15 at the entire force to prevent interference with a component provided under the hood 15, such as a head lamp 3.

The hood overslam bumper according to the related art includes a body 100 having a cylindrical cross section, and an outer peripheral surface of the body 100 is provided with a screw thread groove 101 to which the hood inner panel 2 is coupled. Therefore, when the hood overslam bumper is rotated while being inserted into an insertion hole formed in the hood inner panel 2, the hood overslam bumper is inserted into the hood inner panel 2 or is exposed to the outside along the screw thread groove 101 Therefore, when the hood 15 is closed while rotating the hood overslam bumper, an interval between the hood overslam bumper and the head lamp 3 is appropriately adjusted.

The hood overslam bumper according to the related art as described above may easily endure a load in a closing direction, that is, a load in a vertical direction. However, there was a problem that deformation for a load in a horizontal direction is difficult at the time of dummy collision with a pedestrian.

The information disclosed in this Background section is only for enhancement of understanding of the general background of the invention and should not be taken as an acknowledgement or any form of suggestion that this information forms the prior art already known to a person skilled in the art.

BRIEF SUMMARY

Accordingly, various aspects of the present invention have been made to address the above-mentioned problems occurring in the prior art while advantages achieved by the prior art are maintained intact.

Various aspects of the present invention provide for a hood overslam bumper assembly capable of securing an impact absorption space with respect to a load in a horizontal direction at the time of collision.

Various aspects of the present invention provide for a hood overslam bumper assembly including: an overslam bumper having a cylindrical shape and having a screw thread groove formed in an outer peripheral surface thereof; a ring-carrier having a hole formed at the center thereof to have the overslam bumper inserted into an inner side surface thereof and having a screw thread formed on an inner peripheral surface thereof, the screw thread being coupled to the screw thread groove; and a housing having one side fixed to an insertion hole of a hood inner panel, having a hole formed at the center thereof to have the ring-carrier inserted into an inner side surface thereof, and having an elastic part provided on an outer peripheral surface thereof to fix the ring-carrier inserted into the inner side surface thereof.

The housing may include: a body; a wing part provided at an upper portion of the body and closely adhered or otherwise suitably affixed to the hood inner panel to support the housing so as not to be further inserted into the insertion hole; and a mounting hook protruding from an outer peripheral surface of the body, and a plurality of elastic parts may be provided along the outer peripheral surface of the body.

The electric part may be formed of an elastic member elastically pressing the ring-carrier in an inward direction of the body.

A plurality of mounting hooks may be provided.

The methods and apparatuses of the present invention have other features and advantages which will be apparent from or are set forth in more detail in the accompanying drawings, which are incorporated herein, and the following Detailed Description, which together serve to explain certain principles of the present invention.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention (s) is/are intended to cover not only the exemplary embodiments, but also various alternatives, modifications, equivalents and other embodiments, which may be included within the spirit and scope of the invention as defined by the appended claims.

Figure 1:
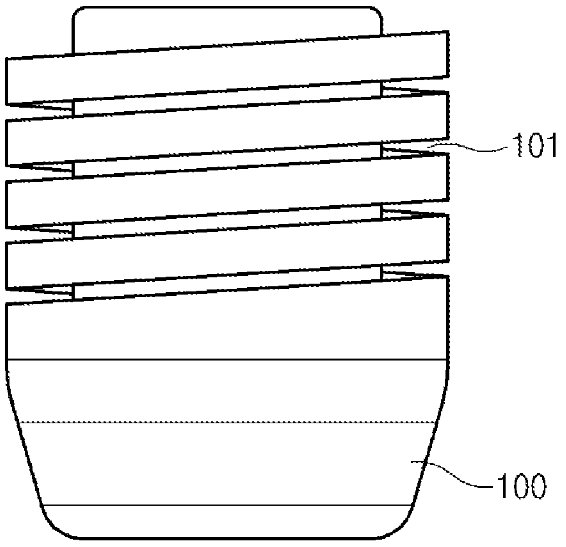
FIG. 1 (Related Art)
FIG. 1 is a view showing an overslam bumper according to the prior art.
Figure 2:
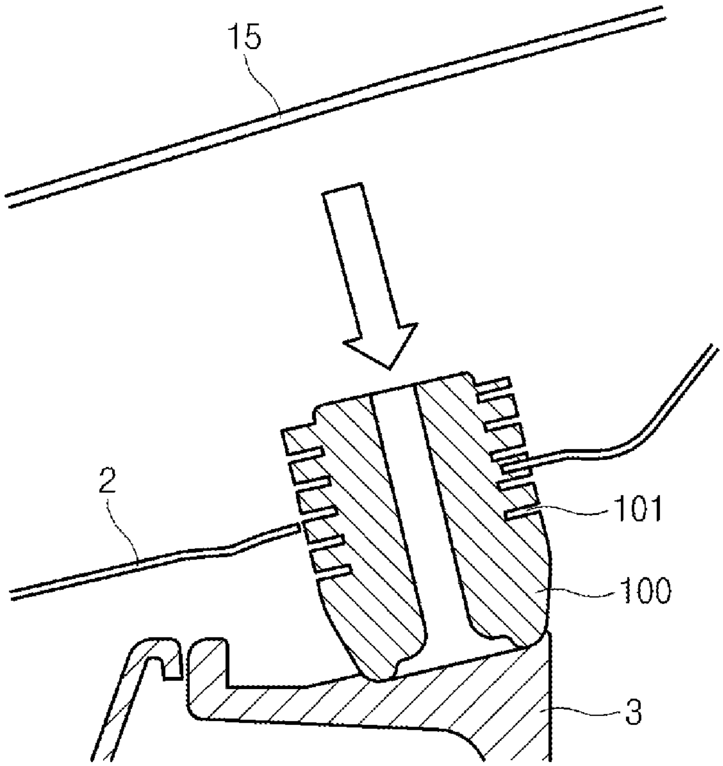
FIG. 2 (Related Art)
FIG. 2 is a view showing a form in which the overslam bumper according to the related art is mounted.
Figure 3:
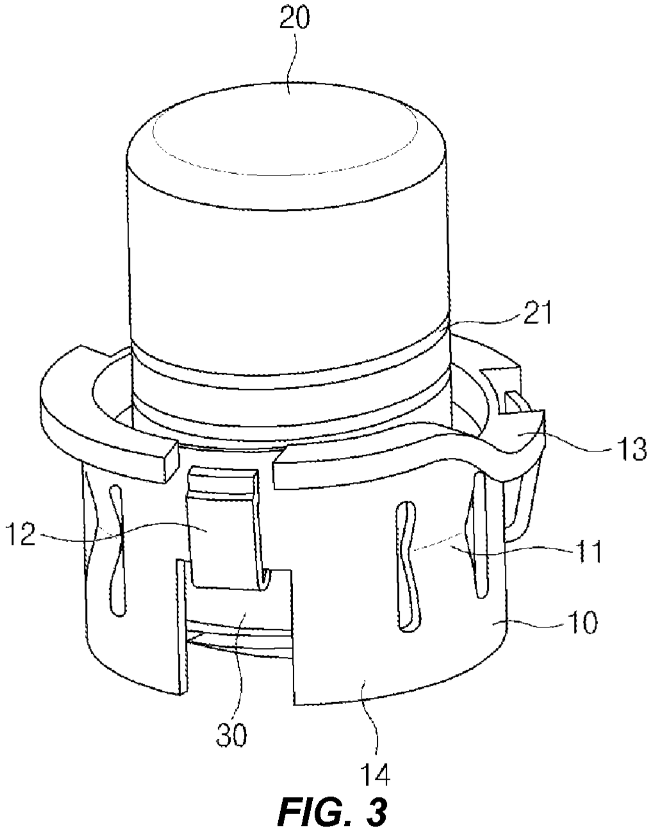
FIG. 3 is a view showing an exemplary overslam bumper assembly according to the present invention.
Figure 4:
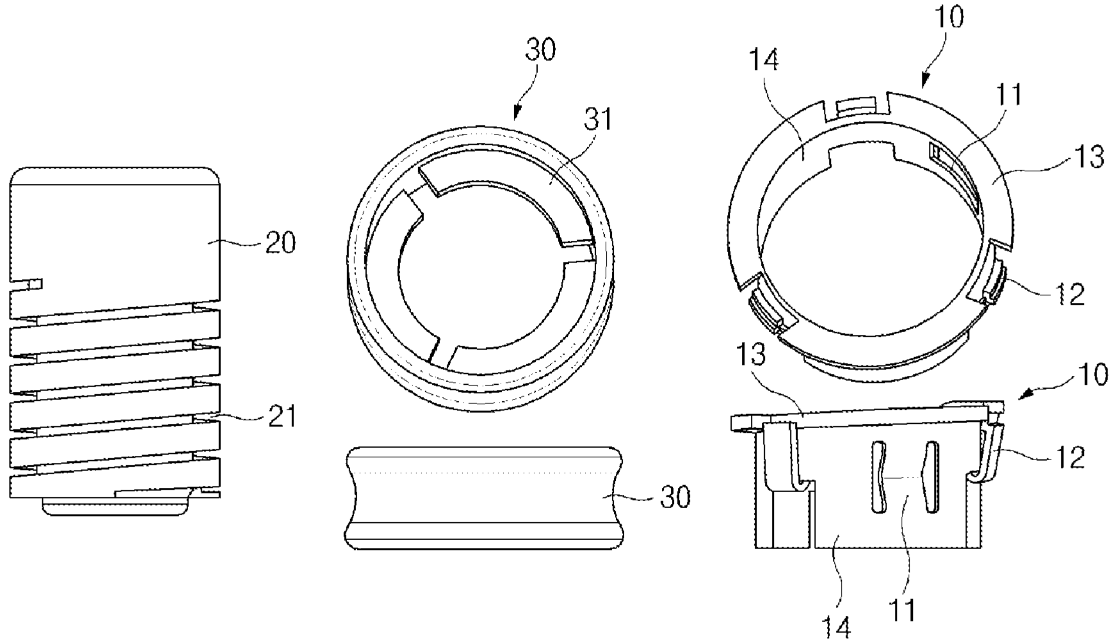
FIG. 4 is a view showing a configuration of an exemplary overslam bumper assembly according to the present invention.
Figure 5A:
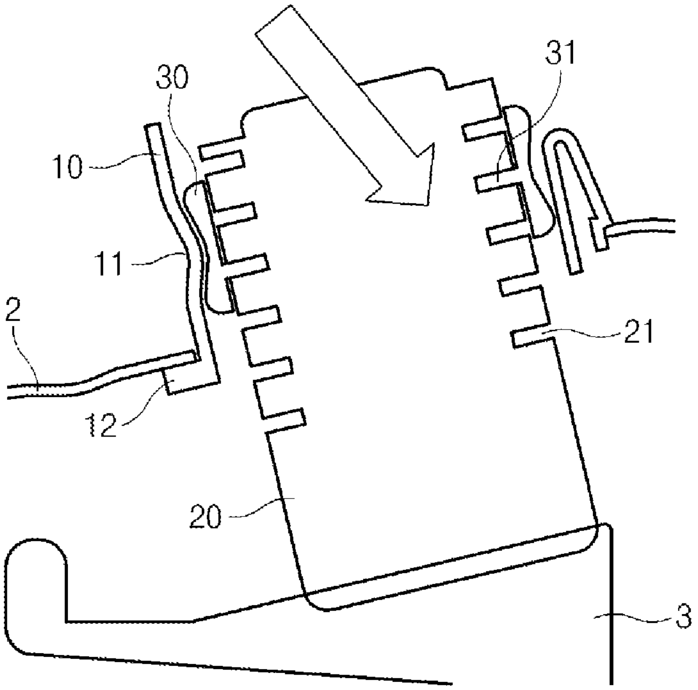
FIGS. 5A, 5B and 5C are views showing a deformation form at the time of collision of an exemplary overslam bumper assembly according to the exemplary embodiment of the present invention.
Figure 5B:
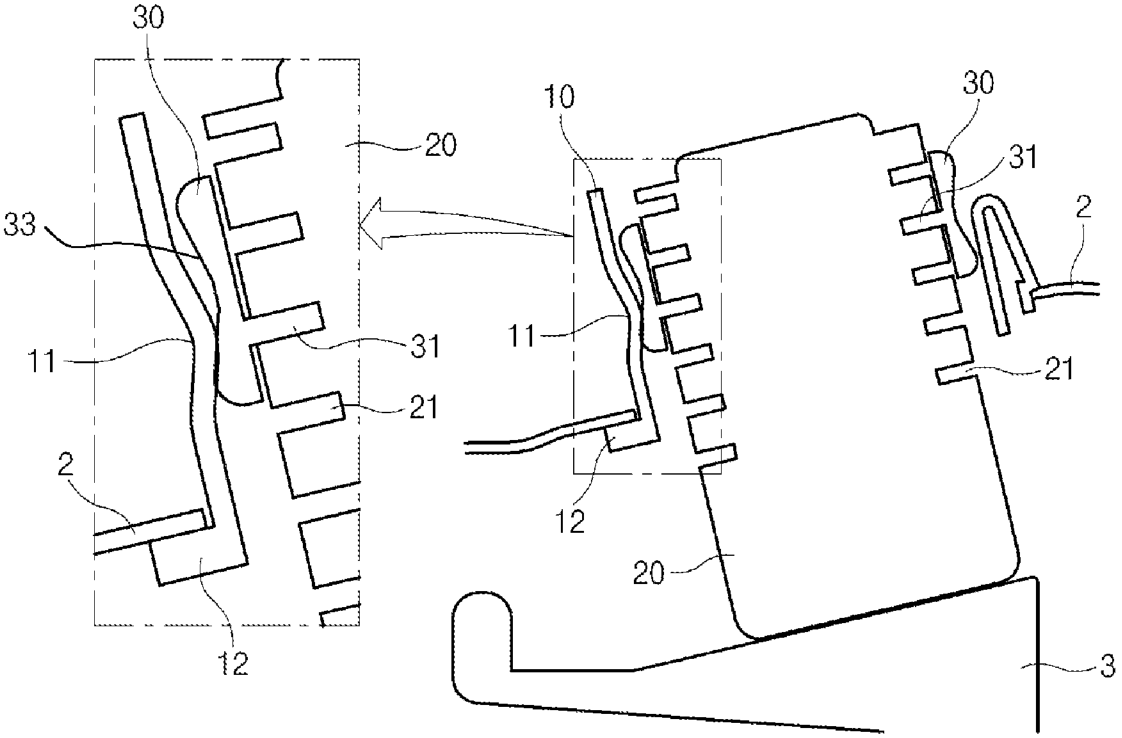
Figure 5C:
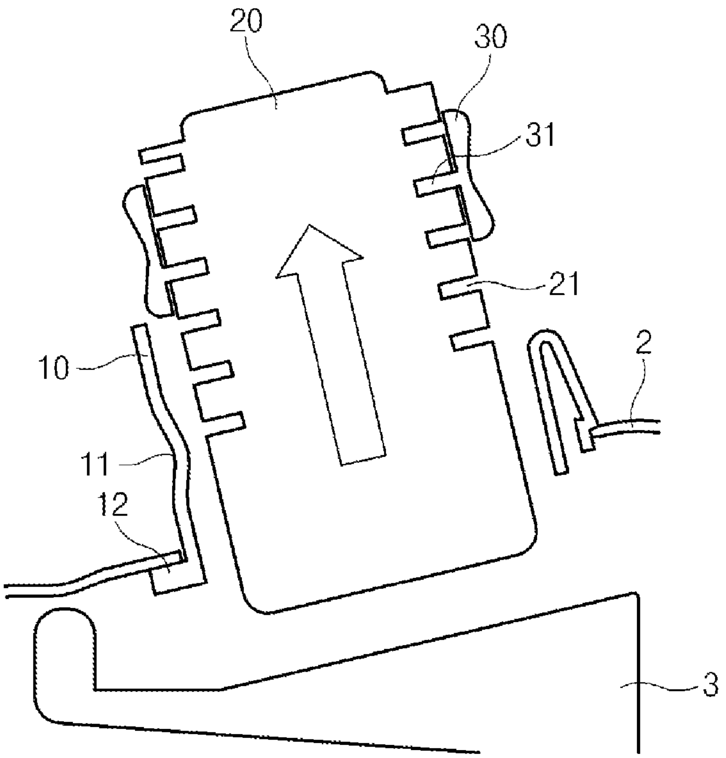

FIG. 3 is a view showing an overslam bumper assembly according to various embodiments of the present invention; FIG. 4 is a view showing a configuration of the overslam bumper assembly according to various embodiments of the present invention; and FIGS. 5A, 5B and 5C are views showing a deformation form at the time of collision of the overslam bumper assembly according to various embodiments of the present invention.

The overslam bumper assembly according to various embodiments of the present invention is configured to include a housing 10 mounted in an insertion hole of a hood inner panel, an overslam bumper 20, and a ring-carrier 30 having the overslam bumper 20 inserted thereinto and fixed thereto and then inserted into and fixed to the housing 10.

The housing 10 is partially inserted into the insertion hole of the hood inner panel and supports the overslam bumper 20 and the ring-carrier 30 so as to be mounted on the hood inner panel. An inner side surface of the housing 10 is provided with a hole into which the ring-carrier 30 is inserted. The housing 10 includes a body 14 inserted into the insertion hole of the hood inner panel and a wing part 13 provided at an upper portion of the body 14 and supporting the housing 10. The wing part 13 is formed integrally with the body 14 along a circumference of the body 14 and is closely adhered to and supported by the hood inner panel. One will appreciate that such integral components may be monolithically formed. in accordance with the present invention.

An outer peripheral surface of the body 14 is provided with a plurality of mounting hooks 12 so that the housing 10 is fixed to the hood inner panel. The mounting hook 12 protrudes from an outer side of the body 14 to have elastic force in an outer direction of the body 14. Therefore, when the housing 10 is inserted into the insertion hole of the hood inner panel, it is fixedly supported by the hood inner panel by the elastic force of the mounting hook 12 in the outer direction.

The outer peripheral surface of the body 14 is provided with elastic parts 11 having elastic force in an inward direction of the body 14. The elastic part 11 may be formed of an elastic member such as a spring and press and support an outer peripheral surface of the ring-carrier 30 inserted into the housing 10. A plurality of elastic parts 11 are provided along the outer peripheral surface of the body 14.

The ring-carrier 30 is inserted into and fixed to an inner side surface of a hole of the housing 10 having the above-mentioned configuration. The ring-carrier 30 has a ring shape in which a hole is formed at the center thereof and has an outer surface supported by the elastic force from the elastic part 11 of the housing 10. In order to increase support force by the elastic force from the elastic part 11, an outer peripheral surface of the ring-carrier 30 has a shape corresponding to that of the elastic part 11 so that an outer side surface of the ring-carrier 30 and the elastic part 11 are closely adhered to each other. As shown in FIG. 4, since the elastic part 11 has a curved shape in which one side thereof is bent toward an inner side of the housing 10, that is, the ring-carrier 30, the outer peripheral surface of the ring-carrier 30 also has a curved portion 33 in which one side thereof is bent inward so as to correspond to that of the electric part 11. The support force is increased as described above, thereby making it possible to prevent the ring-carrier 30 from being separated from the housing 10 due to a slight load.

The ring-carrier 30 has a screw thread 31 formed on an inner side surface thereof. The screw thread 31, which is a member fitted into a screw thread groove 21 of an overslam bumper 20 to be described inserted into the ring-carrier 30 to connect the overslam bumper 20 and the ring-carrier 30 to each other, has a plate shape in which it protrudes from the inner side surface of the ring-carrier 30.

The overslam bumper 20 has a cylindrical shape and includes the screw thread groove 21 formed along the outer peripheral surface thereof. The screw thread 31 of the ring-carrier 20 into which the overslam bumper 20 is inserted is fitted into the screw thread groove 21 to couple the overslam bumper and the ring-carrier to each other. As shown in FIG. 4, the screw thread groove 21 is spirally formed along the overslam bumper 20. Therefore, a height at which the overslam bumper 20 and the ring-carrier 30 are coupled to each other is adjusted, thereby making it possible to adjust a protrusion degree of the overslam bumper 20 from the hood inner panel in accordance with specifications of the vehicle.

In the hood overslam bumper assembly having the above-mentioned configuration, as shown in FIGS. 5A to 5C, when a load in a horizontal direction is transferred to the hood overslam bumper assembly, a shape of the elastic part 11 of the housing 10 is changed. Therefore, support force of the ring-carrier 30 having a shape corresponding to that of the elastic part 11 in which one side thereof is bent inward and closely adhered to and supported by the elastic part 11 is weakened due to generation of a space between the elastic part 11 and the ring-carrier 30 depending on the change in the shape of the elastic part 11. Therefore, as shown in FIG. 5C, the ring-carrier 30 is separated from the hole of the housing 10 in an arrow direction. In this case, since the ring-carrier 30 and the overslam bumper 20 are coupled to each other, the overslam bumper 20 is also separated from the housing 10 in the arrow direction. As described above, in the case in which the load in the horizontal direction is transferred, the overslam bumper 20 and the ring-carrier 30 are separated from the housing 10 in a state in which they are coupled to each other, thereby making it possible to secure an impact absorption space. In addition, since the overslam bumper 20 and the ring-carrier 30 are separated from the housing 10 in an arrow direction of FIG. 5C, as they are, without being damaged due to the load in the horizontal direction, a component may be reused.

As set forth above, with the overslam bumper assembly according to various embodiments of the present invention, in the case in which the load in the horizontal direction due to collision is applied to the overslam bumper assembly, the ring-carrier is separated toward an outer panel due to in a change in a shape of the spring, thereby making it possible to secure an impact absorption space. In addition, damage to the overslam bumper assembly is prevented in spite of the load in the horizontal direction, thereby making it possible to reassemble and reuse the overslam bumper assembly after collision.

For convenience in explanation and accurate definition in the appended claims, the terms upper, front, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hood overslam bumper assembly comprising:

an overslam bumper having a cylindrical shape and having a screw thread groove formed in an outer peripheral surface thereof;

a ring-carrier having a hole formed at a center thereof to receive the overslam bumper into an inner side surface of the hole and having a screw thread formed on an inner peripheral surface of the ring carrier, the screw thread being coupled to the screw thread groove of the overslam bumper; and a housing having one side directly fixed to an insertion hole of a hood inner panel, having a hole formed at a center thereof to have the ring-carrier inserted into an inner side surface thereof, and having an elastic part provided on an outer peripheral surface of the housing to temporarily hold the ring-carrier inserted into the inner side surface of the housing, wherein an outer peripheral surface of the ring carrier has a curved portion and one side of the elastic part is protruded to be temporarily engaged into the curved portion of the ring carrier.

2. The hood overslam bumper assembly according to claim 1, wherein the housing includes:

a body;

a wing part provided at an upper portion of the body and adhered to the hood inner panel to support the housing so as not to be further inserted into the insertion hole; and a mounting hook protruding from an outer peripheral surface of the body, wherein a plurality of elastic parts are provided along the outer peripheral surface of the body.

3. The hood overslam bumper assembly according to claim 2, wherein the elastic parts are formed of an elastic member elastically pressing the ring-carrier in an inward direction of the body.

4. The hood overslam bumper assembly according to claim 2, wherein a plurality of mounting hooks are provided.

5. The hood overslam bumper assembly according to claim 1, wherein the elastic part is formed on the one side of the housing to fix the ring-carrier and another side of the housing is formed flat to detach the ring carrier from the housing.

6. The hood overslam bumper assembly according to claim 1, wherein the curved portion is positioned along an axial direction of the ring carrier and the elastic part is protruded in an axial direction of the housing.

* * * * *